(12) United States Patent  
Eagan et al.

(10) Patent No.: US 7,901,072 B1  
(45) Date of Patent: Mar. 8, 2011

(54) PRISMATIC OCULAR DEVICE AND PERSONAL VIDEO DISPLAY DEVICE INCORPORATING SAME

(75) Inventors: Barry T. Eagan, Spencerport, NY (US); Paul J. Travers, Honeoye Falls, NY (US); Theodore K. Ricks, Rochester, NY (US); Robert J. Schultz, Farmington, NY (US)

(73) Assignee: Vuzix Corporation, Rochester, NY (US)

( * ) Notice: Subject to any disclaimer, the term of this patent is extended or adjusted under 35 U.S.C. 154(b) by 0 days.

(21) Appl. No.: 12/618,456

(22) Filed: Nov. 13, 2009

(51) Int. Cl.
*G02C 1/00* (2006.01)

(52) U.S. Cl. .......................................... 351/158; 359/379

(58) Field of Classification Search .................... 351/41, 351/158, 227–231, 236; 359/374, 379, 473, 359/643, 646; 600/160–164
See application file for complete search history.

(56) References Cited

U.S. PATENT DOCUMENTS

| | | | | |
|---|---|---|---|---|
| 4,673,263 A | * | 6/1987 | Onufryk | 351/158 |
| 5,104,214 A | | 4/1992 | Sims | |
| 5,124,840 A | * | 6/1992 | Trumbull et al. | 359/472 |

* cited by examiner

*Primary Examiner* — Huy K Mai  
(74) *Attorney, Agent, or Firm* — Stephen B. Salai, Esq.; Michael J. Didas, Esq.; Harter Secrest & Emery LLP (57) ABSTRACT

An ocular device includes a housing, a rotatable ring, a first prism fixed in the rotatable ring, an indexable ring and a second prism fixed in the indexable ring. The housing has a stepped inner profile defining first and second circular tracks in the housing, the tracks being concentric about a rotational axis. The rotatable ring is disposed in the first circular track and is freely rotatable about the rotational axis with respect to the housing. The indexable ring is disposed in the second circular track and is indexable about the rotational axis.

19 Claims, 9 Drawing Sheets

PRISMATIC OCULAR DEVICE AND PERSONAL VIDEO DISPLAY DEVICE INCORPORATING SAME

BACKGROUND OF THE INVENTION

The present invention relates to an ocular device. More particularly, the present invention relates to an ocular device used by the visually impaired to redirect light rays entering the eye to unaffected portions of the user's retina.

DESCRIPTION OF RELATED ART

More than fifteen million Americans have age-related macular degeneration (AMD). Experts predict that another two hundred thousand people will be afflicted with the disease each year. On a worldwide scale, approximately seventy million people are believed to be suffering from AMD. As a result of this condition, portions of a person's macula develop dark spots, such that vision is impaired at those dark spots. Such spots may occupy much of the person's field of view. Other vision impairments such as Retinitis Pigmentosa and Diabetic Retinopathy also result in loss of vision within a person's field of view.

To overcome this impaired vision, some visually-impaired people have trained themselves to view objects at an angle, e.g., by looking at things out the corner of their eye. In this way, light is introduced through the pupil at a perceptible angle. In addition, many devices and procedures have been developed with the goal of alleviating the loss of sight resulting from macular degeneration and other vision impairments.

Prism correction has been added to prescription lenses of glasses for individuals with impaired vision to direct a viewed image to functioning or preferred portions of the retina. The required prism is determined by a subjective refraction using discrete steps of prism diopter and base, and once prescribed, the prism is built into the glasses. Because it is ground into the lens of the glasses, the prism cannot be changed without reexamination and the subsequent production of new spectacles.

Other, more extreme measures for correcting visual impairments include vision correction implants that incorporate miniature telescopes. Such telescopes are implanted directly into an afflicted eye to project an image larger on a person's eye, such that the larger image is viewable at more positions on the eye.

These previous attempts to correct visual impairments have drawbacks, however. For instance, adding a prism to a patient's prescription lenses for the purpose of redirecting the image to a different portion of the retina involves a subjective refraction, which, by its nature, involves guessing at the correct base and value of the prism to be added. In addition, once prescribed, the prism becomes a permanent part of the patient's glasses and cannot be changed or optimized without repeating the examination process. Proposed implants are invasive and oftentimes irreversible. They also cannot be modified or further optimized to adapt to a patient's needs. The implantable telescopes described above also are not a best solution because they do not redirect the image to a functioning portion of the retina, but rather enlarge the image so that more area of the retina is used to see the image.

Accordingly, there is a need in the art for an improved ocular device that aids the visually impaired, including those suffering from AMD. There also is a need in the art for an improved ocular device that is readily adjustable by the user.

SUMMARY OF THE INVENTION

The present invention addresses the foregoing needs in the art.

In one aspect, the present invention provides a personal video display device. The video display device includes a wearable frame, a mount, a first prism, and a second prism. The wearable frame contains an image display displaying an image perceptible by the wearer. The mount is selectively attachable to the wearable frame. The first prism is contained in the mount and is disposed between the image display and the wearer's eye. The prism has a first surface facing the image display and a second surface angled relative to the first surface. The second prism is contained in the mount and is disposed between the first prism and the wearer's eye. The second prism has a first surface receiving the image emitted from the second surface of the first prism and a second surface angled relative to the first surface through which the image exits the second prism and is directed to the wearer's eye. The first prism and the second prism are moveable relative to each other to alter an angle at which the image exits the second prism and is directed to the wearer's eye.

In another aspect, the present invention provides an ocular device. The ocular device includes a housing, a rotatable ring, a first prism fixed in the rotatable ring, an indexable ring and a second prism fixed in the indexable ring. The housing has a stepped inner profile defining first and second circular tracks in the housing, the tracks being concentric about a rotational axis. The rotatable ring is disposed in the first circular track and is freely rotatable about the rotational axis with respect to the housing. The indexable ring is disposed in the second circular track and is indexable about the rotational axis These and other aspects, features, and objects of the invention may be had with reference to the following description and accompanying figures, in which the preferred embodiments of the invention are described and shown.

DETAILED DESCRIPTION OF PREFERRED EMBODIMENTS

Figure 1:
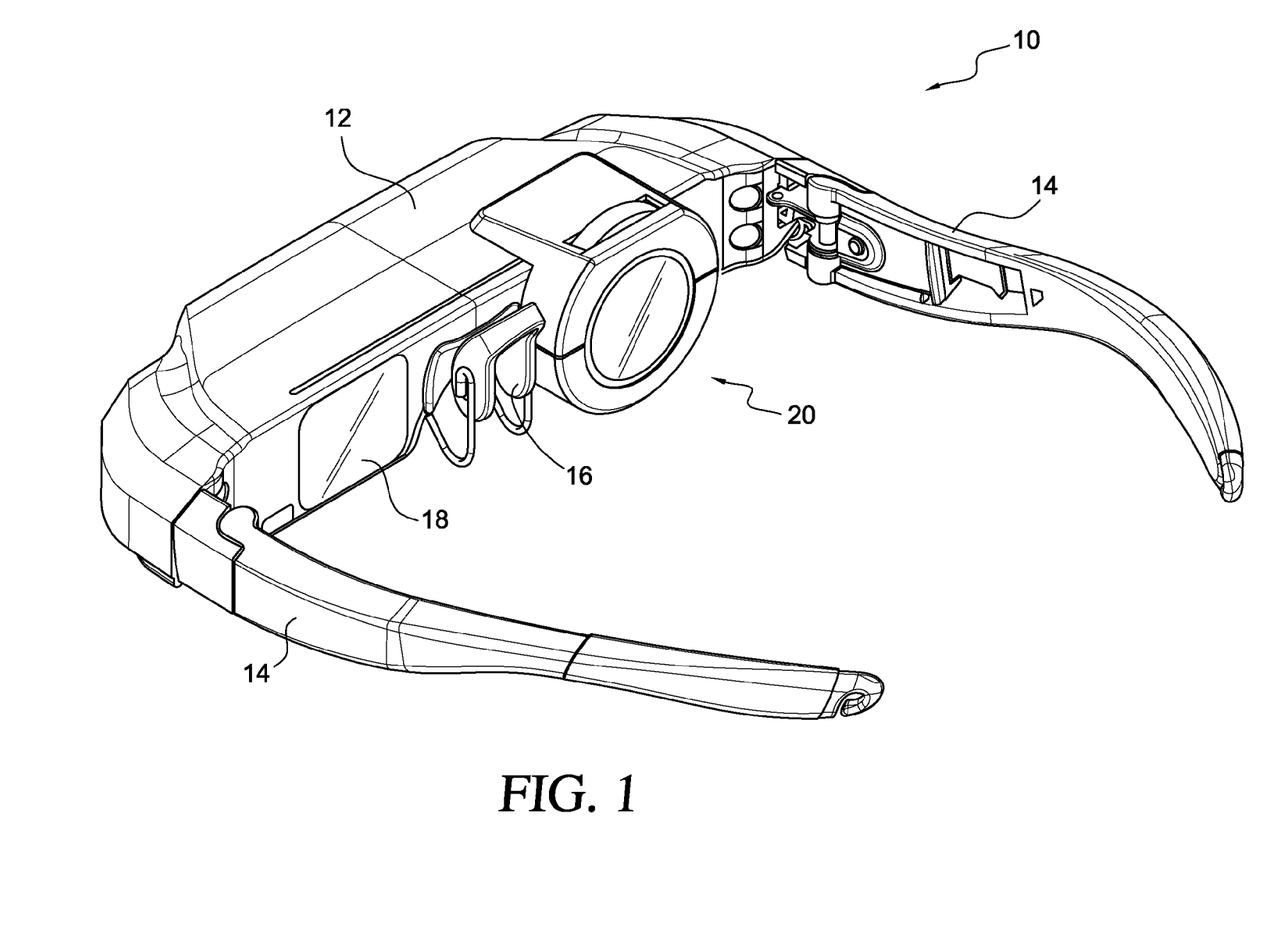
FIG. 1 is a perspective view of a personal video display device with an associated ocular device according to the present invention.

Preferred embodiments of the present invention will now be described with reference to the figures. As illustrated in FIG. 1, the present invention includes a personal video display device 10, which may be similar to the personal video display devices sold by Vuzix Corporation of Rochester, N.Y. under the trademarks SIGHTMATE and iWear®. The display device 10 generally includes a frame 12 with bows 14 depending from the frame 12. The video display device 10 is wearable by placing the bows 14 on the user's ears with the frame 12 disposed in front of the wearer's eyes. A nosepiece 16 also may be provided to support the frame 12 on the user's face. As is conventionally known, the video display device 10 includes two eye boxes 18 (only one is shown in FIG. 1). Each of the eye boxes 18 registers with one of the wearer's eyes and a pair of display screens (not shown) is disposed within the frame 12 such that each of the screens is viewable through one of the eye boxes 18. Thus, the wearer views content displayed on the display screens through the eye boxes 18.

Figure 6:
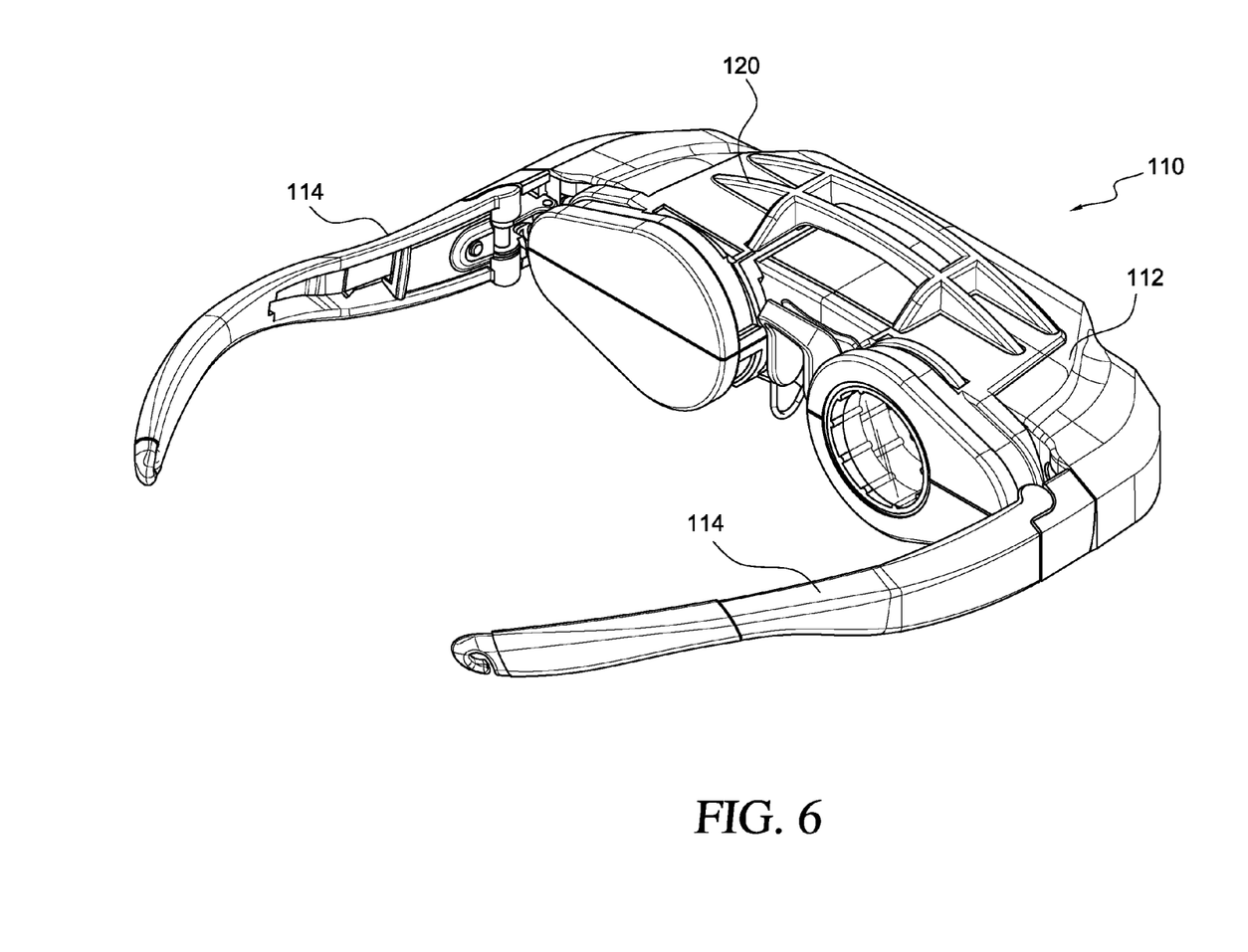
FIG. 6 is a perspective view of a personal video display device with an ocular device according to another embodiment of the invention.
Figure 7A:
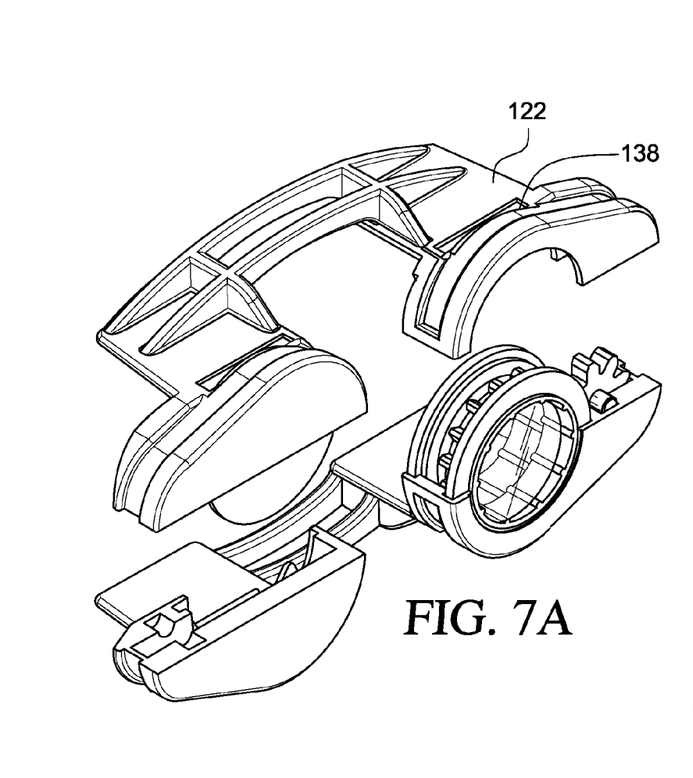
FIGS. 7A and 7B are, respectively, perspective and exploded perspective views of the ocular device illustrated in FIG. 6.
Figure 7B:
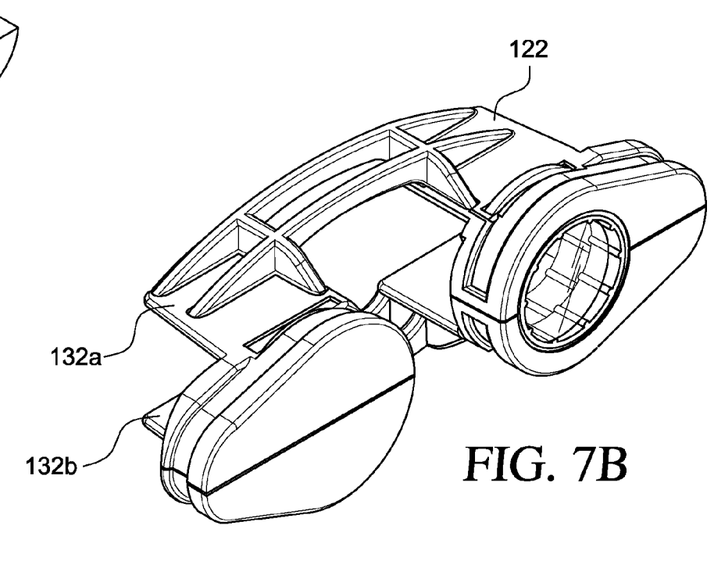

As also shown in FIG. 1, the personal video display device 10 includes an ocular device 20. The ocular device 20 is mounted on the frame 12 so as to substantially cover one of the eye boxes 18. Thus, when the user wears the personal video display device 10 with attached ocular device 20, the wearer will view one of the display screens through the ocular device 20. In an alternative embodiment, a second ocular device could be provided over the other eye box 18 to assist viewing in both eyes, or the ocular device could include additional structure to cover one of the eye boxes 18, similar to what is shown in FIGS. 6, 7A, and 7B, described in more detail, below. Although it may be fixed, the ocular device 20 preferably is releasably attachable to multiple positions of the frame 12 of the personal video display device 10. In this manner, a user can determine whether to use the ocular device 20, as well as decide which eye benefits from the ocular device when only one ocular device 20 is provided.

Figure 2:
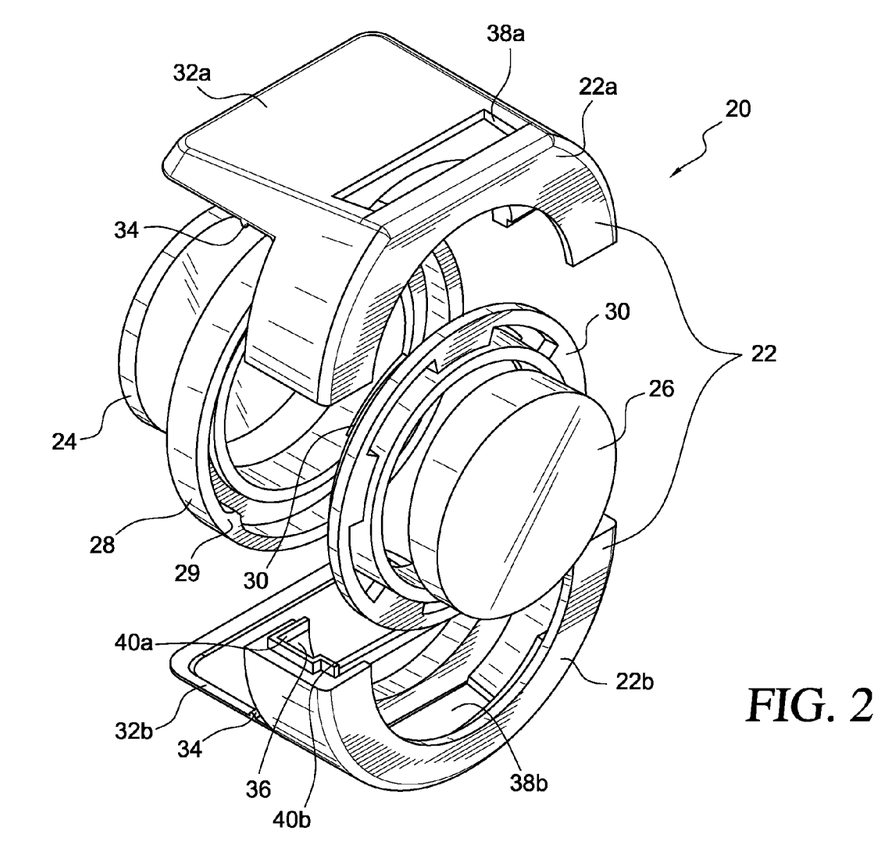
FIG. 2 is an exploded perspective view of the ocular device shown in FIG. 1.

Turning now to FIG. 2, the ocular device 20 will be described in more detail. As illustrated, the ocular device 20 includes a housing 22, shown as upper and lower housing sections 22a, 22b. The ocular device 20 also includes a first prism 24 and a second prism 26 as well as a first ring 28 to which the first prism 24 is mounted and a second ring 30 to which the second prism 26 is mounted.

The housing 22 has an upper protrusion 32a and a lower protrusion 32b. When the ocular device 20 is assembled, the distance between the upper protrusion 32a and the lower protrusion 32b substantially corresponds in size to the thickness ("t" in FIG. 1) of the frame 12 of the personal video display device 10. In this manner, the ocular device 20 can be "clipped" onto the frame 12 by contacting the upper protrusion 32a with a top surface of the frame 12 and the lower protrusion 32b with a bottom surface of the frame. To promote attachment of the ocular device 20, the distance between the upper protrusion 32a and the lower protrusion 32b may be slightly less than the thickness t of the frame 12, such that the upper and lower protrusions are slightly deflected away from each other when the ocular device 20 is mounted on the frame. Accordingly, a bias force is created and the upper and lower protrusions "clamp" the housing to the frame 12.

Ribs 34 also may be provided on one or both of the upper and lower protrusion 32a, 32b to cooperate with a ridge or indentation formed on one or both of the upper and lower surfaces of the frame 12, to maintain the ocular device 20 on the personal video display device 10. Any number of alternative methodologies may be used to retain the ocular device 20 on the personal video display device 10. These can include detent mechanisms, fasteners, or any other attachment mechanism that promotes retention of the ocular device 20 on the frame in a position in which the ocular device 20 is alignable with the eye box 18 of the personal video display device 10.

The housing 22 also includes a lens retaining portion 36. In this embodiment, the lens retaining portion 36 is substantially cylindrical with a stepped inner profile. The stepped profile provides two concentric tracks 40a, 40b. The first and second rings 28, 30 are retained in the concentric tracks 40a, 40b. Preferably, the rings are retained in the tracks such that movement of the rings 28, 30 is prohibited, except for rotationally about a rotational axis corresponding with an axis of the tracks 40a, 40b.

A pair of apertures 38a, 38b also are provided in the housing 22, preferably aligned with one of the tracks 40a, 40b. Accordingly, when the ocular device 20 is assembled, one of the rings 28, 30 protrudes through the apertures 38a, 38b. In the embodiment of FIG. 2, the apertures 38a, 38b are formed through the track 40a such that the first ring 28 protrudes through the apertures 38a, 38b. The protruding portion of the first ring 28 is manually manipulatable, that is, a user can rotate the first ring 28 in the housing 22, i.e., within the corresponding concentric track 40a.

The first lens 24 is fixed within the first ring 28 and the second lens 26 is fixed within the second ring 30. Accordingly, rotation of each of the rings 28, 30 within the housing 22 also rotates the corresponding first or second lens 24, 26. In a preferred embodiment, the first lens 24 and the first ring 28 are sized such that the first lens 24 is press fit into the first ring 28 and the second lens 26 and the second ring 30 are sized such that the second lens 26 is press fit into the second ring 30. In other embodiments, fasteners, adhesives, or the like could additionally or alternatively be used to contain each lens in its respective ring.

The first prism 24 and the second prism 26 preferably are round wedge prisms. That is each of the prisms 24, 26 has two round planar surfaces that are angled relative to each other, resulting in a thicker region, called the base, and a thinner region. In a preferred embodiment, the prisms are identical, that is, they have the same offset angle between the first and second planar surfaces. Through experimentation, the inventors have found that a preferred offset angle between the first and second surfaces of each prism is four degrees, resulting in a 4 diopter prism, although such is not required. It is also not required that the prisms be identical, although the inventors have found that such an arrangement lends itself to efficient and effective adjustment, as will be described in more detail below.

The first ring 28 of the ocular device 20 illustrated in FIGS. 1 and 2 is rotated by a user about the rotational axis along which both the first and second prisms 24, 26 are aligned (i.e., by manual manipulation of the portion of the first ring 28 exposed through the apertures). This rotation of the first ring 28 rotates the first prism 24, but because in the preferred embodiment, the rings 28, 30 holding the first and second prisms 24, 26 are sufficiently spaced that the first and second prisms 24, 26 move relative to each other, the second ring 30 (and thus the second prism 26) does not move. By rotating the second prism 26 relative to the first prism 24, light exiting the first prism, which light has been deflected by the first prism 24, is again deflected by the second prism before entering the user's eye. Because the first prism 24 remains stationary while the second prism 26 is rotated, the light exiting the first prism travels along a known path, i.e., 4 degrees from the angle at which the light entered the prism for a 4 diopter prism. This known path is then altered by rotation of the second prism 26.

Figure 3A:
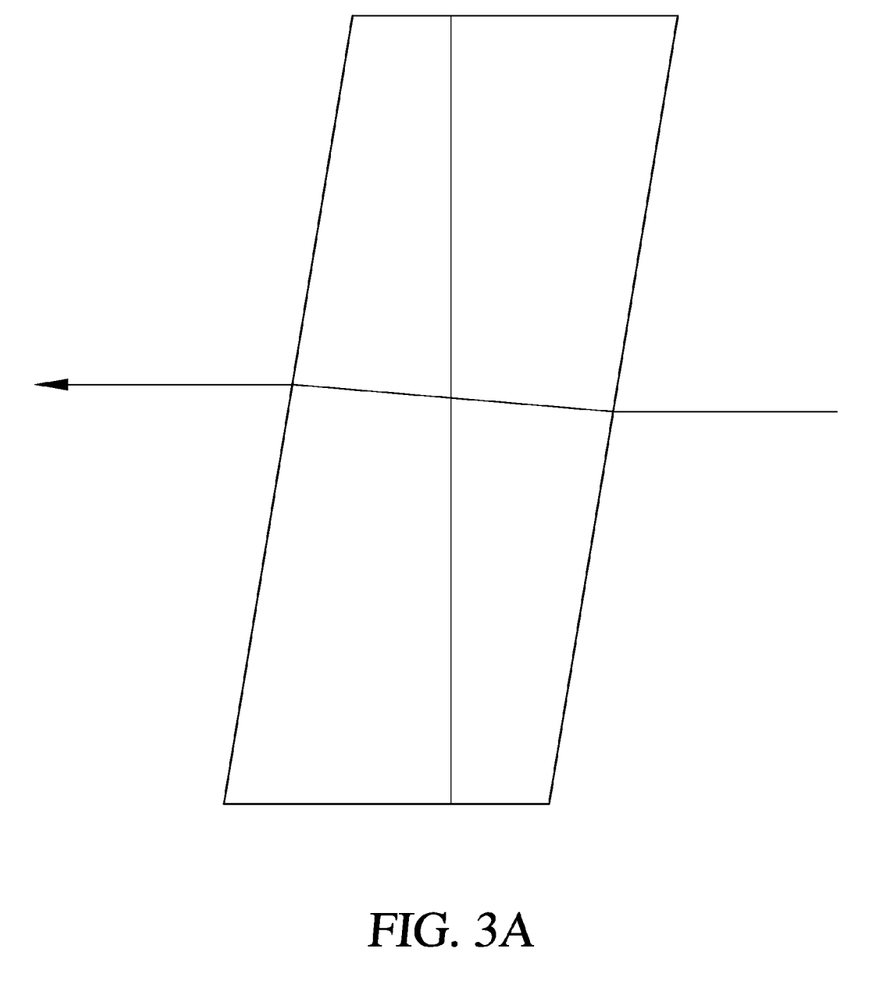
FIGS. 3a and 3b each illustrate an alignment of two prisms contained in the ocular device of FIG. 2.

As should be understood, when the prisms have substantially the same construction, with a 4 degree offset between first and second surfaces, light rays passing through the two prisms 24, 26 can be substantially unmoved from the original angle, or may be deflected up to 8 degrees from the original angle. Specifically, as illustrated in FIG. 3A, light emitted from the display screen is refracted four degrees through the first prism and when the prisms are aligned opposite each other, i.e. with the prism bases arranged 180 degrees from each other, the net effect is zero degrees of angular deflection. In this arrangement of the ocular device 20, the image viewed by the user is substantially unchanged from the image on the display contained in the display device 10.

Figure 3B:
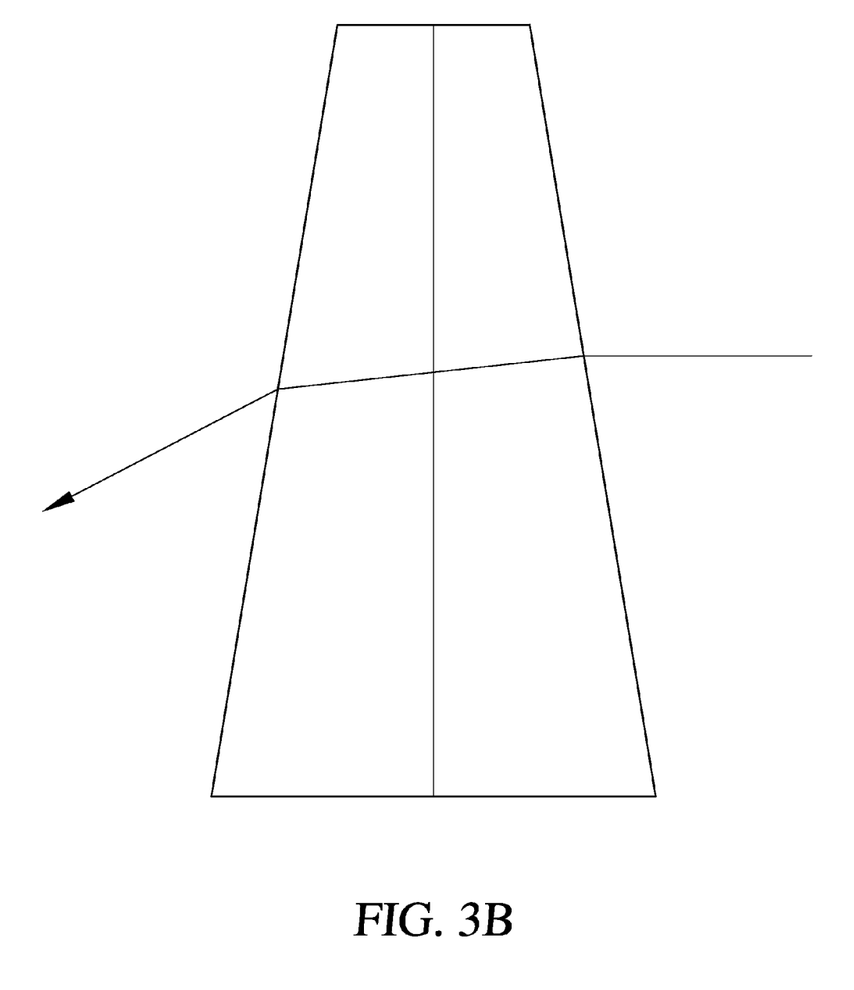

In FIG. 3B, the prisms are arranged such that the maximum thicknesses of the prisms are aligned, that is, the bases of the prisms are aligned. Accordingly, the light is deflected four degrees through the first prism and another four degrees through the second prism, resulting in a total deflection of 8 degrees. As will be appreciated by those of ordinary skill in the art, any deflection between 0 degrees and 8 degrees can also be achieved, by rotating the second prism 26 with respect to first prism 24.

By deflecting images from the display using the two prisms as just described, the light comprising the image can be redirected to portions of the eye that are unaffected, or less affected, by a visual impairment, thereby allowing the user to see the image that would have been otherwise imperceptible without deflection.

Each user has different impairments and the present invention is particularly useful because it allows the user to adjust the positioning of the prisms relative to each other, to maximize viewing. In one contemplated embodiment, the apertures 38a, 38b may be sufficiently large, or differently constructed, such that both the first and second rings 28, 30 are accessible to the user for manipulation. In this manner, the user has unfettered control of the positioning of both prisms, and thus can create any alignment combination.

However, the inventors recognize that it may be desirable instead to provide the user a structured methodology to find an ideal alignment. Specifically, in the preferred embodiment described above, the first prism 24 is a rotatable prism that is fully rotatable by the user by contacting the first ring 28 via the apertures 38a, 38b. Also in this embodiment, the second prism and second ring are not accessible by the user. It is still beneficial, however, to make the second prism movable to steer the image exiting the first prism. To this end, the second prism of this embodiment of the invention is an indexing prism that automatically indexes upon a rotation of the rotatable prism through a predetermined range of motion, e.g., a full 360-degree rotation of the second prism.

Figure 4:
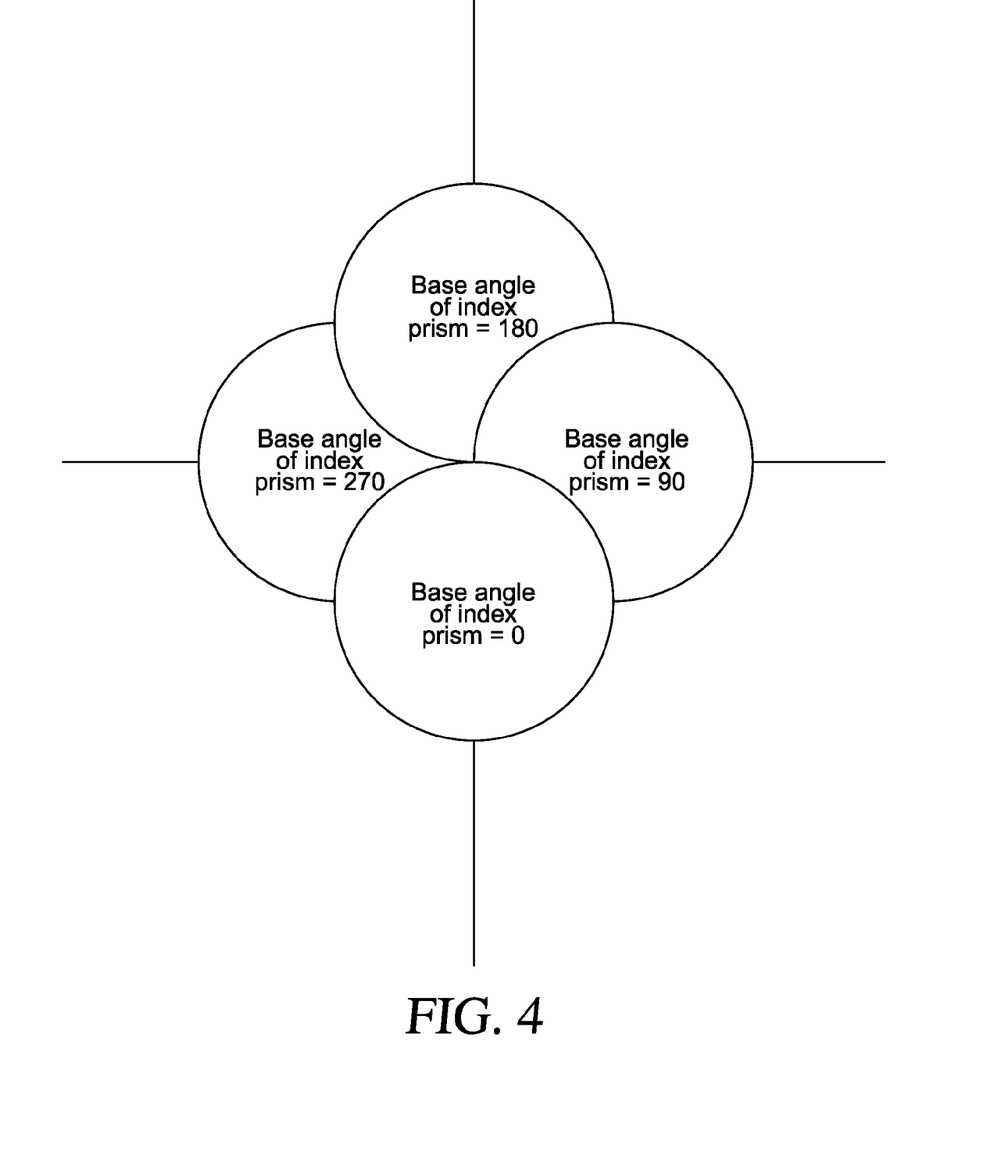
FIG. 4 is a graphical representation of position of an image of view through the ocular device of FIG. 2, at different rotational positions about a viewing access.

According to this arrangement, the indexing prism deflects light received from the rotatable prism 4 degrees toward its thickest portion. With the indexing prism constrained in a first position, rotating the rotatable prism through a 360 degree range of motion moves the image only within a first area that is smaller than the complete field of view of the user. However, this area is adjusted by indexing the first prism. As the rotatable prism approaches 360 degree rotation, the indexing prism indexes about the rotational axis a predetermined amount, e.g., 45-degrees or 90-degrees. With the indexing prism indexed, rotation of the rotatable prism will result in a similar movement of the image, but within a second area in the user's field of view. This second area is different from the first area achieved at the previous position of the indexing prism. Continued indexing will move the area, similar to what is shown schematically in FIG. 4. The number of discrete area smaller than the user's field of view is directly related to the number of times the indexing prism may be indexed through a complete 360-degree rotation. By continuously rotating the rotatable prism, and thus indexing the indexing prism, the ocular device 20 allows for steering of the image through much if not all of the user's field of view.

The indexing preferably is achieved through the interrelation of the first and second rings. Specifically, in the embodiment of FIG. 2, the first ring 28 is mechanically related to the second ring 30 such that a full rotation of the first ring 28 results in a partial rotation of the second ring 30. This can be accomplished by slightly offsetting the axis of the two rings, and incorporating a protrusion 29 on the first ring 28 that engages a surface 31 on the second ring 30 over the range when the two rings' orbits overlap. In this manner, the second ring 30 turns during the engaged portion of the first rings' rotation, but remains stationary during the remainder of the first ring's rotation. As noted above, the first prism 24 is rigidly attached to each of the first ring 28 and the second prism is rigidly attached to the second ring 30, thus mimicking the rings' motion, and providing the prism rotating and indexing described in previous paragraphs.

Figure 5A:
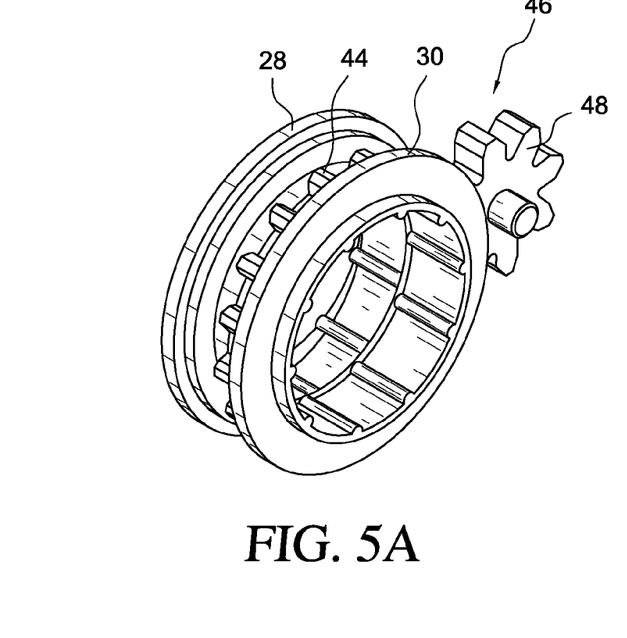
FIGS. 5A, 5B and 5C are, respectively, perspective, exploded perspective, and perspective views illustrating an indexing mechanism according to a preferred embodiment of the invention.
Figure 5B:
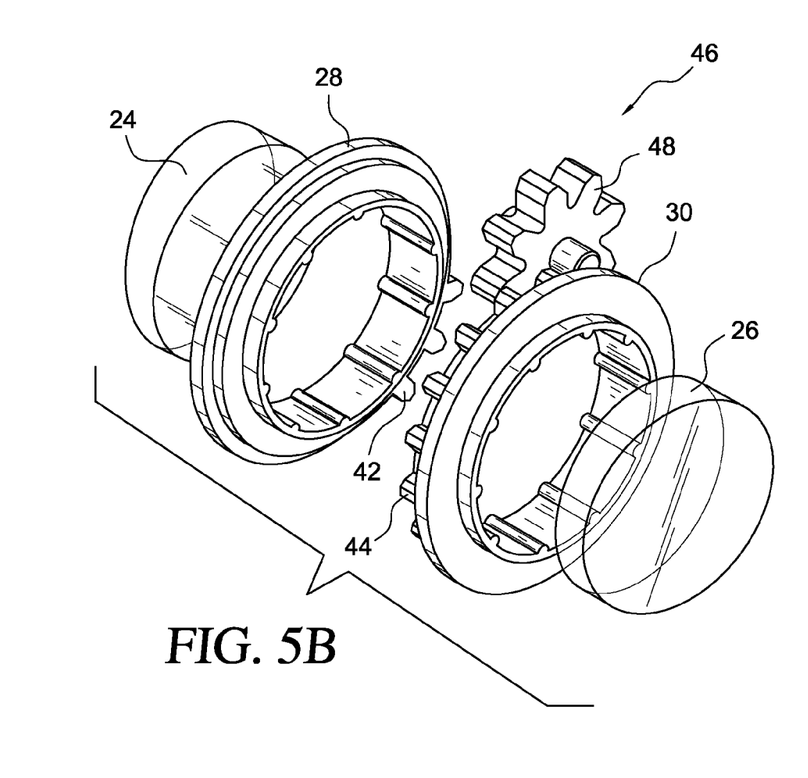
Figure 5C:
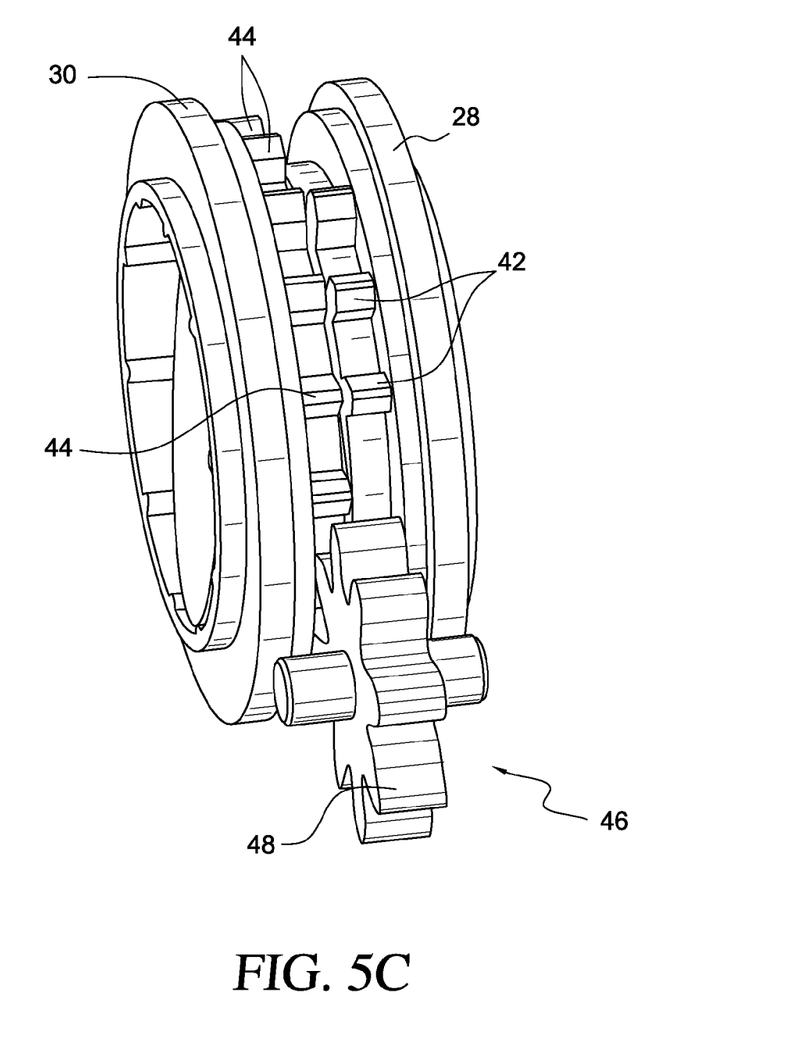

In another embodiment, illustrated in FIGS. 5A-5C, a gearing mechanism is provided that performs the rotating and indexing functions described above. Specifically, in this embodiment, the first ring 28 includes one or more skip teeth 42 provided only on a limited portion of the outer periphery of the first ring 28 and the second ring 30 includes indexing teeth 44, arranged equally spaced over the entire outer periphery of the second ring 30. As illustrated, the rings 28, 30 are arranged to rotate about a common axis with the teeth 42, 44 in close proximity. An indexing gear 46 also is provided, offset from the axis of the first and second rings 28, 30 such that the teeth 42, 44 of the first and second rings 28, 30 can be registered with gear teeth 48 of the gear 46. In operation, the first ring 28 is rotated by the user, and for most of the range of motion of the first ring 28, the skip teeth 42 do not engage the gear teeth 48. However, when the skip teeth 42 do engage the gear teeth 48, the gear is turned to correspondingly index the second ring 30. Continued turning of the first ring 28 causes its skip teeth 42 to disengage the gear teeth 48, thus allowing for continued rotation of the first ring (and thus the first prism) with the second ring 30 at a next indexed position. The number of skip teeth 42 and the design of the indexing gear can be adjusted to determine the degree of indexing.

As should be appreciated by those of ordinary skill in the art, the invention is not limited to the indexing and rotatable prisms. In alternative embodiments, the prisms could be translatable relative to each other, in which case they also may not be round. In such an alternative embodiment, the circular tracks of the housing 22 illustrated in FIG. 2 could instead be linear tracks, or the movement could be done through different means altogether.

As noted above, the preferred embodiment allows for manual manipulation of the first and second prisms, to allow a user to optimize the ocular device for a personalized experience. Servomotors or other automatic drivers may alternatively be provided in the housing to drive one or both of the prisms, thereby alleviating the need for manual manipulation.

Other modifications of the invention also are contemplated. For example, the invention is not limited to four diopter prisms. Larger diopter prisms can result in a greater deflection of light, but the inventors have found that when the ocular device of the invention is used with a personal video display device such as described above, prisms with larger than 4 diopters generally provide no additional benefit. This is because the distance between the ocular device and the eye is such that deflection of the image with a prism having larger than 4 diopters will result in light hitting the iris, instead of entering the pupil. Of course, if the distance between the ocular device and the eye changes, so too could the optimum angle between the planar surfaces of the prisms.

Another contemplated modification to the embodiments described above is the addition of a stop or locking mechanism that maintains the positioning of the first and second prisms, once a preferred viewing position is achieved by the wearer. The locking mechanism could be a detent, set-screw, or some other readily usable mechanism. The locking mechanism would alleviate the need for the user to recalibrate the device with each use.

Although the invention has been described as usable with a personal video display device, such is not required. The ocular device may alternatively be a hand-held device that allows a user to view his/her surroundings merely by holding the device in front of the eye. The device could also be configured to mount to any viewing device other than a personal video display device.

Although in the illustrative embodiments described above, the first and second prisms are retained in rings, the rings may not be necessary. For example, the user or an automatic means could contact the prisms directly to facilitate their movement. Alternatively, protuberances or the like could be fixed to the prisms, which protuberances could be manipulated by the user or some automated means.

In still another embodiment, the first and second prisms could be mounted to the frame of the display device inside the frame. Thus, the ocular device of the invention could be contained in the frame instead of as a separate part. This could be especially useful if the display device is specifically made for the vision-impaired.

Yet another embodiment of the invention is illustrated in FIGS. 6, 7A and 7B. In this embodiment, a personal video display device 110 having a frame 112, bows 114, and nosepiece 116 has mounted thereon a binocular device 120. The binocular device is similar to the ocular device 20 of the previous embodiments, but a housing 122 is designed to cover both eye boxes (not shown) of the display device 110. In the illustrated embodiment, one set of prism pairs such as those described above in connection with the monocular device is shown for registration with the eye box corresponding to the user's right eye, while the eye box associated with the user's left eye is completely occluded. Two sets of prisms could alternatively be provided, one registering with each eye, or the prisms could be provided in registration with the left eye, with the right eye occluded, instead. To this end, the housing 122 of this embodiment is reversible, that is it may be attached in the position shown or an inverted position, to register the prism pair with the left eye instead of the right eye.

Many features of the binocular device 120 and the housing 122 are substantially the same as the features of the monocular device. For example, the prism pair is illustrated as including a gearing mechanism such as that described in connection with FIGS. 5A-5C. A ring of the prism pair is manipulatable by the user through an aperture 138. Moreover, protrusions 132a, 132b, are provided to selectively attach the housing 122 to the frame 112 of the display device 110.

The foregoing embodiments of the present invention are provided as exemplary embodiments and presently known best modes for carrying out the invention. Modifications of these embodiments will be readily apparent to those of ordinary skill in the art. The invention is not intended to be limited by the foregoing embodiments, but instead is intended to be limited only by the appended claims.

The invention claimed is:

1. A personal video display device comprising:
   a wearable frame containing an image display displaying an image perceptible by the wearer;
   a mount attached to the wearable frame;
   a first prism contained in the mount and disposed between the image display and the wearer's eye, the first prism having a first surface facing the image display for receiving the image and a second surface angled relative to the first surface through which the image exits the first prism; and
   a second prism contained in the mount and disposed between the first prism and the wearer's eye, the second prism having a first surface receiving the image emitted from the second surface of the first prism and a second surface angled relative to the first surface through which the image exits the second prism and is directed to the wearer's eye,
   the first prism and the second prism being movable relative to each other to alter an angle at which the image exits the second prism and is directed to the wearer's eye.

2. The personal video display device of claim 1, wherein the first prism and the second prism are wedge prisms.

3. The personal video display device of claim 1, wherein the angles between the respective first and second surfaces of the first and second prisms are substantially the same.

4. The personal video display device of claim 3, wherein the angles are about 4 degrees.

5. The personal video display device of claim 1, wherein the first and second prisms are rotatable about a substantially common axis along which the first and second prisms are arranged.

6. The personal video display device of claim 1, wherein at least one of the first and second prisms is round.

7. The personal video display device of claim 1, wherein at least one of the first and second prisms is freely movable by the wearer.

8. The personal video display device of claim 1, wherein one of the first and second prisms is a rotating prism rotatable through a range of motion about a rotational axis and the other of the first and second prisms is an indexing prism indexable about the rotational axis.

9. The personal video display device of claim 8, wherein the indexing prism is indexed upon completion of rotation of the rotating prism through the range of motion.

10. The personal video display device of claim 8, wherein the rotating prism is freely rotatable by the wearer.

11. The personal video display device of claim 8, wherein rotation of the rotating prism through the range of motion moves the image within a first defined portion of the wearer's field of view and wherein indexing the indexing prism defines a second defined portion of the wearer's field of view different from the first defined portion of the wearer's field of view.

12. The personal video display device of claim 1, further comprising a gearing mechanism for indexing the indexing prism.

13. The personal video display device of claim 1, further comprising a stop for maintaining a position of the first and second prisms.

14. An ocular device comprising:
   a housing having a stepped inner profile defining first and second circular tracks in the housing, the tracks being concentric about a rotational axis;
   a rotatable ring disposed in the first circular track and freely rotatable about the rotational axis with respect to the housing;
   a first prism fixed in the rotatable ring;

an indexable ring disposed in the second circular track and indexable about the rotational axis; and a second prism fixed in the indexable ring.

15. The ocular device of claim 14, further comprising a mount adapted to mount the housing to a personal video display device.

16. The ocular device of claim 15, wherein the mount comprises spaced-apart protrusions depending from the housing and adapted to engage top and bottom surfaces of a frame of the personal video display device.

17. The ocular device of claim 14, wherein the housing includes an aperture through which the rotatable ring protrudes for manipulation of the rotatable ring by the wearer.

18. The ocular device of claim 14, wherein the position of the indexing ring in the second circular track defines an area on the wearer's eye in which the image is projected, and rotating the rotatable ring moves the image within the defined area.

19. The ocular device of claim 18, wherein indexing the indexing ring redefines the defined area.

* * * * *